Patented Apr. 14, 1942

2,279,881

UNITED STATES PATENT OFFICE 2,279,881

INTERPOLYMER OF DI-(SECONDARY BUTYL) ITACONATE AND ETHYL METHACRYLATE

Gaetano F. D'Alelio, Pittsfield, Mass., assignor to General Electric Company, a corporation of New York No Drawing. Application September 12, 1939, Serial No. 294,493

2 Claims. (Cl. 260—78)

This invention relates to the production of new materials having valuable and characteristic properties that make them especially suitable for use in industry, for example in molding, laminating, casting, coating and adhesive applications and for other purposes. The invention is concerned more particularly with compositions of matter comprising an interpolymer of an itaconic ester in which at least one ester group contains three or four saturated carbon atoms in the alcohol residue and, in addition to said ester, at least one other polymerizable compound containing the structure $$-CH=C\diagup_{\diagdown}$$

more particularly a

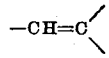 grouping

Specifically the invention is concerned with a composition comprising the product of polymerization of a mixture containing di-(secondary butyl) itaconate (di-s-butyl itaconate) and ethyl methacrylate in the ratio of, by weight, 5 parts of the former to 95 parts of the latter, which polymerization product has a higher flexural strength and a higher impact strength than ethyl methacrylate when polymerized alone under similar conditions.

The new esters prepared and used in practicing this invention conveniently may be defined as itaconic esters in which at least one ester group contains at least three and less than five saturated carbon atoms in the alcohol residue. Examples of such esters are monopropyl itaconate,

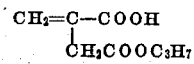

methyl propyl itaconate,

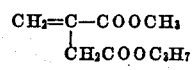

and ethyl butyl itaconate,

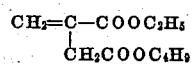

It will be noted that the two last-named esters are mixed esters, the preparation of which is in general somewhat difficult and complicated, involving extensive processing and high cost. The mono esters are not difficult to make but no particular advantages ordinarily accrue from their use in the production of interpolymers. Hence, the preferred embodiment of this invention comprises the preparation, and utilization in the production of interpolymers, of diesters of itaconic acid in which both ester groups are identical (symmetrical diesters), for example the dipropyl and the dibutyl esters. The mixed and symmetrical itaconic diesters with which this invention is especially concerned may be graphically expressed by the formula

where R and R' are alkyl radicals containing at least three and less than five saturated carbon atoms in the alcohol residue and are the same or different, but preferably are the same.

The prior known methyl, ethyl and optically active amyl itaconic esters are reported as being hard, brittle masses in polymeric state. Ordinarily, it would be expected that esters intermediate to the polymeric ethyl and the amyl esters likewise would be hard, brittle masses. Surprisingly, the polymeric propyl and butyl esters of this invention vary between viscous or soft, non-flowing masses to resilient, stiff masses.

In carrying the present invention into effect the normal and isomeric forms of aliphatic mono- and di-esters of itaconic acid containing three or four saturated carbon atoms in the alcohol residue of the ester grouping may be polymerized separately, or mixed with each other, or mixed with other polymerizable material. The homogeneous and heterogeneous polymers of this invention vary from viscous masses to rubbery and hard, solid bodies, depending upon the extent of polymerization and the particular polymerizable or other modifying agent, if any, which is incorporated therewith. Heat, light, or heat and light may be used to effect polymerization, although under such conditions the rate of polymerization is relatively slow. Hence, to accelerate the polymerization, I prefer to use a catalyst, accompanied by heat, light, or heat and light. Examples of catalysts which may be used are oxygen, ozone, hydrogen peroxide, sulfuric acid, aluminum chloride, boron fluoride, superoxides such as aliphatic acyl peroxides, e. g., acetyl peroxide, stearyl peroxide, etc., peroxides of the aromatic acid series, e. g. benzoyl peroxide. Benzoyl peroxide is the preferred catalyst because of its ease of handling, its relative freedom from explosive hazards and its ready solubility in the monomeric or partially polymerized itaconic esters. The rate of polymerization is a function of the temperature and may be carried out at from room temperature (20°–30° C.) to temperatures materially above 100° C., for example about 130° C.

The monomeric propyl, butyl and propyl butyl itaconic esters when polymerized alone form thermoplastic materials, that is, materials the shape of which easily can be changed by heat. The softening point, solubility and other properties of these itaconic esters depend upon the number of carbon atoms in, and the structure of, the ester chain. In general, the longer the ester chain, the lower is the softening point of the polymer. Some of the completely polymerized esters are clear, colorless, rubbery solids. Others are soft, free-flowing, viscous masses at temperatures of about 100° C., yet highly viscous or soft, slightly mobile masses at room temperature. Some possess properties intermediate to the aforementioned characteristics.

In many applications the normally viscous, mobile polymers of high plastic flow are exceptionally valuable, particularly where non-volatilizing materials that can accommodate themselves to the form of the container are required. Particularly are they valuable when used alone, or when dissolved or dispersed in other dielectric materials including a liquid hydrocarbon such as mineral oil. This property of high plastic flow can be used to great commercial advantage in molding processes by interpolymerizing these monomers with other bodies of low plastic flow, thereby imparting the desired flow characteristics to the end-product.

In other cases, for example where it is desired to prepare products of higher softening point or of decreased brittleness and solubility, or to produce insoluble, infusible products, this may be done by copolymerizing a selected monomeric or partially polymerized ester of this invention with polymerizable unsaturated materials in monomeric or partially polymerized state, for example an ester of a polybasic acid in which at least two ester groups each contain an unsaturated hydrocarbon radical, more particularly a

 radical such as vinyl, allyl, methallyl, etc. Also, copolymers of valuable properties may be obtained by copolymerizing propyl, or butyl, or propyl butyl itaconate with other monomeric or partly polymerized itaconic esters, for example, dimethyl itaconate, diethyl itaconate, itaconic esters of unsaturated alcohols, for instance diallyl itaconate, etc., vinyl and allyl esters of saturated and unsaturated mono- and poly-carboxylic acids, etc., more particularly with polymerizable materials containing a

 grouping for instance monomeric or partly polymerized styrene, vinyl esters such as the acetate, chloride, bromide, fluoride, etc., vinyl ketones, meth-vinyl ketones, vinylidene halides as the chloride, bromide and fluoride, acrylic and methacrylic esters, e. g., methyl acrylate, ethyl acrylate, propyl acrylate, butyl acrylate, methyl methacrylate, ethyl methacrylate, propyl methacrylate, butyl methacrylate, etc.

As illustrative of the differences in properties resulting from interpolymerizing the itaconic esters with which this invention is concerned with other polymerizable materials, the following is mentioned:

Dibutyl itaconate which had been polymerized in the presence of 1% by weight benzoyl peroxide for about 3 days at approximately 70° C. showed considerable flow at that temperature. The same material when copolymerized under the same conditions with only 20% by weight of diallyl itaconate formed a firm, non-flowing gel in 1 hour and set within 3 days to a hard, clear, colorless, highly heat-resistant copolymer that was insoluble in solvents, such as acetone and benzene, in which the dibutyl itaconate, which had been polymerized alone, was soluble.

As a further illustration the following example also is given. A solution of 5 parts secondary butyl itaconate (di-s-butyl itaconate) and 95 parts ethyl methacrylate was treated with 0.25 part benzoyl peroxide for 23 hours at 55° C. and for 24 hours at 85° C., yielding a hard, clear copolymer. The material was extremely ductile and could not be broken in a flexural strength test. It had an impact strength (Dynstat) of 0.164 ft. lb. Ethyl methacrylate, polymerized alone under similar conditions, broke in a flexural strength test at 7450 pounds per square inch and had an impact strength of 0.135 foot pounds.

Various methods may be used to prepare the esters with which this invention is concerned. For example, they may be prepared by ester exchange reactions in the presence of a suitable inhibiting agent, such as phenolic bodies, copper, etc., and a suitable catalyst, the reaction proceeding as in an alcoholysis. Thus, in the preparation of, for instance dibutyl itaconate, the reactants may comprise butyl alcohol, dimethyl or diethyl itaconate, hydroquinone as an inhibiting agent and a catalyst such as metallic sodium, potassium carbonate, sulfuric acid, etc. The esters of this invention also may be prepared from itaconic nitrile by causing to react therewith an alcohol, corresponding to the ester desired, in the presence of water and an inorganic acid. Or, they may be made from itaconyl chloride and a selected alcohol, or by decomposition of a corresponding ester of citric or citraconic acids or one of their derivatives.

A preferred method of preparation is by direct esterification of itaconic acid with the selected alcohol in the presence of an esterification catalyst, with or without the presence of other unreactive bodies to remove the water resulting from esterification. This method may be carried out continuously.

The mixed esters of this invention, that is itaconic esters in which both ester groups are different, also may be prepared in various ways. Illustrative of such esters are propyl butyl itaconate, n-propyl isobutyl itaconate, isopropyl n-butyl itaconate, isopropyl isobutyl itaconate, propyl s-butyl itaconate and n-butyl t-butyl itaconate. These mixed esters may be prepared, for instance, by effecting reaction between itaconic monoester acid chloride and a selected alcohol in the presence or absence of an inhibiting agent such as phenolic bodies, copper, etc. They also may be made by ester exchange reactions in the presence of a suitable catalyst, using an ester of a lower boiling alcohol, such as dimethyl or diethyl itaconate, and an alcohol corresponding to the ester desired.

Another method of preparation of these mixed esters is from itaconic monoacid chloride and a selected alcohol, followed by direct esterification of the other acid radical by another alcohol. These mixed esters also may be made by direct consecutive esterification of each of the carboxyl groups with different alcohols, or by treating itaconic di-acid chloride first with one alcohol, then with another. They also may be prepared by saponification of one group of an itaconic diester with alcoholic potassium hydroxide in the cold and either isolating the monoacid from the potassium salt for further reaction with the selected alcohol or causing the potassium salt to react directly with an alkyl sulfate corresponding to the ester desired.

In order that those skilled in the art better may understand how the present invention may be carried into effect, the following illustrative examples are given of the preparation of these new esters and of various compositions comprising the same. All parts are by weight.

*Mono-propyl itaconate*

The mono-potassium salt of mono-propyl itaconate ester was prepared by the slow addition of a solution of 100 parts dipropyl itaconate in 100 parts absolute alcohol to 26.1 parts potassium hydroxide dissolved in 235 parts absolute alcohol, followed by gentle refluxing for about 3 hours. The mono-potassium salt was isolated by evaporation of the solvent alcohol and freed from any potassium carbonate formed by extracting the ester salt with benzene or petroleum ether or some other suitable solvent. When dried at 85–100° C., 43.9 parts of the ester salt was obtained. The free mono-propyl ester of itaconic acid was isolated by the addition of 22 parts of 35% hydrochloric acid solution to the potassium salt. The acid mono-ester was isolated by evaporation to practical dryness of the above solution, followed by extraction with absolute alcohol to eliminate potassium chloride.

*Dipropyl itaconate*

195 parts itaconic acid, 210 parts propyl alcohol, 180 parts benzene and 5.9 parts sulfuric acid (95.5%) were refluxed in a continuous esterification apparatus until no more water of esterification was given off. The residual liquid was washed first with a 10% solution of $Na_2CO_3$, then with water, after which it was filtered and distilled. A colorless distillate of dipropyl itaconate, boiling point 94°–98° C. at 1.5 mm. pressure, was obtained.

A sample of dipropyl itaconate was polymerized by incorporating therein 0.5% by weight benzoyl peroxide and heating for approximately 38 hours at 90°–100° C. The polymeric material was a soft, non-flowing mass.

Similarly the following esters were prepared: (a) Di-isopropyl itaconate, boiling at 87°–95° C. at 2.5 mm. pressure. It was heat-polymerized to a quite stiff, resilient mass which was slightly tacky at room temperature. (b) Di-butyl itaconate, boiling at 159°–162° C. at 14.5–15 mm. pressure. It polymerized to a non-flowing polymer, slightly softer than similarly polymerized di-propyl itaconate. (c) Di-isobutyl itaconate (an itaconic diester of a branched chain butyl alcohol), boiling at 95°–99° C. at 1.5 mm. pressure. It polymerized to a non-flowing mass, slightly softer than similarly polymerized di-isopropyl itaconate. (d) Propyl butyl itaconate, boiling at 108°–112° C. at 1.5 mm. pressure. It polymerized to a viscous flowable resinous body. (e) Di-s-butyl itaconate (an itaconic diester of a branched chain butyl alcohol), boiling at 95°–100° C. at 1.5 mm. pressure. It polymerized to a viscous mass, slightly softer than similarly polymerized di-isobutyl itaconate.

The following examples are illustrative of the production of interpolymers of this invention. All parts are by weight. Polymerization was effected by heating the material, to which, unless otherwise stated, 1% benzoyl peroxide had been added, at approximately 70° C. for the stated time. Unless otherwise designated the components of the initial mixture were in monomeric form. The designation P before certain components has reference to partly polymerized material.

*Example 1*

This example illustrates the production of two-component copolymers utilizing the new esters of this invention.

| | Components | Copolymerization time in hours | Characteristics of copolymer |
|---|---|---|---|
| (a) | 5 parts di-isopropyl itaconate<br>5 parts vinyl acetate | 120 | Rubbery. |
| (b) | 50 parts di-isopropyl itaconate<br>50 parts methyl acrylate | 72 | Clear, colorless, slightly soft. |
| (c) | 50 parts di-isopropyl itaconate<br>50 parts ethyl acrylate | 72 | Hard, clear, colorless. |
| (d) | 50 parts di-isopropyl itaconate<br>50 parts methyl methacrylate | 48 | Hard, tough, clear, colorless. |
| (e) | 50 parts di-isopropyl itaconate<br>50 parts propyl methacrylate | 72 | Clear, colorless. |
| (f) | 50 parts di-isopropyl itaconate<br>50 parts n-butyl methacrylate | 72 | Do. |
| (g) | 50 parts di-isopropyl itaconate<br>50 parts isobutyl methacrylate | 72 | Do. |
| (h) | 60 parts di-isopropyl itaconate<br>40 parts isobutyl methacrylate | 48 | Do. |
| (i) | 80 parts di-isopropyl itaconate<br>20 parts diallyl itaconate | 72 | Clear, colorless, thermosetting. |
| (j) | 50 parts dibutyl itaconate<br>50 parts vinyl acetate | 48 | Clear, colorless, rubbery. |
| (k) | 50 parts dibutyl itaconate<br>50 parts styrene | 72 | Soft, opaque. |
| (l) | 80 parts dibutyl itaconate<br>20 parts diallyl itaconate | 1<br>72 | Solid gel hard, clear, colorless, thermosetting |
| (m) | 50 parts dibutyl itaconate<br>50 parts methallyl methacrylate | 24 | Slightly soft, clear, thermosetting. |
| (n) | 5 parts dibutyl itaconate<br>5 parts methyl methacrylate | 48 | Clear, colorless, somewhat rubbery tough. |
| (o) | 50 parts dibutyl itaconate<br>50 parts ethylene glycol dimethacrylate | 24 | Hard, translucent, almost opaque, thermosetting. |
| (p) | 5 parts s-butyl itaconate, 55° C.<br>95 parts ethyl methacrylate, 85° C.<br>0.25% benzoyl peroxide | 23<br>24 | Translucent, hard, clear. |
| (q) | 5 parts s-butyl itaconate, 55° C.<br>95 parts methylmethacrylate, 85° C.<br>0.25% benzoyl peroxide | 18<br>24 | Hard, translucent. |

Unless otherwise stated the interpolymers of this example are thermoplastic. The addition of as little as 0.1 part of a polyallyl ester of a polycarboxylic acid, specifically diallyl itaconate, to the mixed monomers results in interpolymers of increased solvent-resistance, heat-resistance, or heat- and solvent-resistance. By suitably increasing the percentage proportion of such diallyl esters, insoluble infusible interpolymers can be produced.

Example 2

This example illustrates the production of three-component copolymers utilizing the new esters of this invention.

| | Components | Copolymerization time in hours | Characteristics of copolymer |
|---|---|---|---|
| (a) | 43 parts dipropyl itaconate<br>43 parts vinyl acetate<br>14 parts ethyl acrylate | 48 | Clear, colorless, slightly soft. |
| (b) | 45 parts dipropyl itaconate<br>45 parts diethyl itaconate<br>10 parts glycol dimethacrylate | 48 | Hard, colorless, thermosetting, clear. |
| (c) | 5 parts di-isopropyl itaconate<br>2.5 parts vinyl acetate<br>2.5 parts methyl methacrylate | 72 | Hard, clear. |
| (d) | 37.5 parts di-isopropyl itaconate<br>37.5 parts methyl methacrylate<br>25.0 parts ethyl acrylate | 48 | Hard, tough, clear. |
| (e) | 50 parts di-isopropyl itaconate<br>33 parts iso-butyl methacrylate<br>17 parts methyl acrylate | 48 | Somewhat rubbery, clear. |
| (f) | 50 parts dibutyl itaconate<br>25 parts methyl methacrylate<br>25 parts styrene | 120 | Hard, translucent. |
| (g) | 50 parts dibutyl itaconate<br>25 parts vinyl acetate<br>25 parts styrene | 120 | Translucent, somewhat rubbery. |
| (h) | 5 parts dibutyl itaconate<br>2.5 parts vinyl acetate<br>2.5 parts methyl methacrylate | 72 | Tough. |
| (i) | 37.5 parts bidutyl itaconate<br>25.0 parts isobutyl methacrylate<br>37.5 parts styrene | 48 | Very viscous |
| (j) | 40 parts propyl itaconate, 90° C.<br>0.5% benzoyl peroxide<br>10 parts allyl itaconate<br>50 parts ethyl methacrylate | 1<br>2½<br>11½ | Non-flowable mass resilient gel<br>Hard. |
| (k) | 40 parts butyl itaconate, 90° C.<br>0.5% benzoyl peroxide<br>10 parts allyl itaconate<br>50 parts ethyl methacrylate | 1<br>2½<br>11½ | Do. |

Example 3

This example illustrates the production of four-component copolymers utilizing the new esters of this invention.

| | Components | Copolymerization time in hours | Characteristics of copolymer |
|---|---|---|---|
| (a) | 37.5 parts di-isopropyl itaconate<br>12.5 parts n-butyl methacrylate<br>12.5 parts ethyl acrylate<br>37.5 parts vinyl acetate | 48 | Translucent, hard, tough. |
| (b) | 33⅓ parts di-isopropyl itaconate<br>10⅚ parts n-butyl methacrylate<br>22½ parts ethyl acrylate<br>33⅓ parts styrene | 48 | Clear, viscous. |
| (c) | 30 parts di-isopropyl itaconate<br>30 parts methyl methacrylate<br>10 parts methyl acrylate<br>30 parts styrene | 48 | Clear, colorless, somewhat soft. |
| (d) | 3 parts dibutyl itaconate<br>3 parts vinyl acetate<br>3 parts methyl methacrylate<br>1 part styrene | 24 | Hard, translucent. |

Example 4

This example illustrates the production of copolymers utilizing dibutyl itaconate and wherein at least one of the components is in a partially polymerized state prior to copolymerization.

| | Components | Copolymerization time in hours | Characteristics of copolymer |
|---|---|---|---|
| (a) | 50 parts dibutyl itaconate<br>50 parts P n-butyl methacrylate | 36 | Clear, rubbery thermoplastic. |
| (b) | 50 parts P dibutyl itaconate<br>50 parts P methyl methacrylate | 48 | Slightly soft, translucent. |
| (c) | 50 parts P dibutyl itaconate<br>50 parts P vinyl acetate | 48 | Translucent, rubbery. |
| (d) | 50 parts P dibutyl itaconate<br>50 parts P styrene | 36 | Viscous |
| (e) | 50 parts P dibutyl itaconate<br>50 parts P ethyl acrylate | 48 | Viscous, translucent. |
| (f) | 50 parts P styrene<br>50 parts P dibutyl itaconate<br>50 parts P ethyl acrylate | 48 | Rubbery, translucent. |
| (g) | 50 parts P dibutyl itaconate<br>50 parts methallyl methacrylate | 36 | Hard, opaque, thermosetting. |
| (h) | 50 parts P disbutyl itaconate<br>50 parts ethylene glycol dimethacrylate | 36 | Thermosetting, opaque. |
| (i) | 33⅓ parts P dibutyl itaconate<br>33⅓ parts P dimethyl itaconate<br>33⅓ parts diallyl maleate | 48 | Soft, clear gel. |

The diallyl itaconate, the methallyl methacrylate, the glycol dimethacrylate and the diallyl maleate used in production of the copolymers of the above illustrative examples may be increased or may be replaced in whole or in part by substances such, for instance, as allyl and methallyl esters of polybasic acids, for example, by diallyl carbonate, diallyl oxalate, diallyl malonate, diallyl succinate, diallyl glutarate, diallyl adipate, diallyl pimelate, diallyl suberate, diallyl azelaate, diallyl sebacate, diallyl alpha dimethyl malonate, diallyl alpha allyl malonate, diallyl fumarate, diallyl phthalate, diallyl tartrate, triallyl citrate, triallyl carballylate, diallyl citraconate, diallyl mesaconate, diallyl glutaconate, diallyl hydromucate, diallyl glutinate, tetrallyl symmetrical ethane tetracarboxylate, etc.; by other polyhydric alcohol and unsaturated alcohol esters of acrylic and methacrylic acids, for example, glycol acrylate, allyl acrylate, allyl methacrylate, methallyl acrylate, etc.; or by mixtures of such substances.

The itaconic esters of this invention, as well as the interpolymers obtained by copolymerizing these esters with other polymerizable bodies, have a wide range of properties. Their hardness and solubilities may be varied over a considerable range from fluid compositions of varied intrinsic viscosity or soft, flexible bodies to hard, rigid masses that can be swelled or dissolved in many volatile and non-volatile solvents, even those of a hydrocarbon nature. By suitable selection of the starting monomeric or partly polymerized materials, interpolymers can be obtained in an insoluble, infusible state practically resistant to the destructive effect of other chemical bodies such as acids, bases, solvents and the like.

When a plasticizing effect is desired in some other synthetic or natural plastic or potentially plastic material, the itaconic esters of this invention are particularly suited for that purpose. High molecular weight bodies such as polyvinyl chloride, cellulose esters such as the acetate, propionate, butyrate, etc., cellulose ethers such as methyl cellulose, ethyl cellulose, benzyl cellulose, etc.; polymerized methyl methacrylate, polystyrene, etc., may be plasticized by incorporating therewith these new itaconic esters in monomeric, partially polymerized or completely polymerized state, in the presence or absence of a catalyst such as benzoyl peroxide when the monomeric or partially polymerized forms are used. The itaconic ester may be incorporated into the high molecular weight body by simple mechanical agitation or by the use of mutual solvents, followed by the standard mechanical processes known to the plastics art. These bodies then may be subjected to further heat and pressure treatment if desired.

The esters of this invention may be converted to polymers or interpolymers in molds with or without the application of pressure, in the presence or absence of a material which is a solvent for the monomer but not for the polymer, or one which is a solvent for both monomer and polymer, or one which is not a solvent for either the monomer or polymer so that spongy or granulated polymeric modifications are obtained.

The solid, thermoplastic polymers and copolymers of this invention, with or without modifying agents, may be used in injection, compression, or transfer molding processes to make numerous articles for industrial, technical and novelty use and other applications.

As modifying agents, various fillers may be used, for example, wood flour, alpha flock, sand, asbestos, mica, paper, cloth, cellulose derivatives such as cellulose itself, regenerated cellulose, cellulose esters, cellulose ethers, natural and synthetic filaments or fibers, etc., in continuous, shredded, or comminuted form. Pigments, dyes, opacifiers, plasticizing substances, such has dibutyl phthalate, esters of monobasic and polybasic saturated and unsaturated acids, esters of aromatic monobasic and polybasic acids, etc. may be incorporated into the polymers and copolymers of this invention to modify the same. Synthetic and natural resins, gums, oils, waxes, polyhalogenated aromatic derivatives, etc., likewise may be added as modifying agents.

In solvents, or without solvent utilizing a melt process, the fusible polymers may be used in adhesive and laminating applications, to bond paper, wood, mica flakes, glass sheets, rubber sheets, fibrous materials such as silk, asbestos, glass fibers, synthetic fibers in filament, thread or fabric (woven or felted) form, cellulose derivatives in sheet, comminuted or fiber form, etc. In the form of liquid coating compositions such as varnishes, lacquers, enamels, etc., they find application in surface protective coatings, such as for walls, desks, wire, concrete, porcelains, etc. In a flowable condition without the use of solvents they may be used as impregnants for many porous bodies, such as cork, pottery, felts, or fabricated bodies with interstices, such as the windings of electrical coils, netted fiber, interwoven fibrous materials, etc.

When the monomers of this invention are copolymerized with, for example, diallyl itaconate in the presence of another non-polymerizable body which acts as a solvent for these monomers, there results a homogeneous gelled material which firmly binds the solvent so as to reduce to a minimum evaporation losses of the solvent. Illustrative of non-polymerizable bodies which thus may be gelled are butyl alcohol, benzene, ethylene dichloride, the monohalogenated aromatic hydrocarbons or mixtures of halogenated aromatic hydrocarbons, ethylene glycol, mineral oils including lubricating oils, etc.

What I claim as new and desire to secure by Letters Patent of the United States is:

1. A composition comprising the product of polymerization of a mixture containing di-s-butyl itaconate and ethyl methacrylate in the ratio of, by weight, 5 parts of the former to 95 parts of the latter, said polymerization product having a higher flexural strength and a higher impact strength than ethyl methacrylate when polymerized alone under similar conditions.

2. The method of producing a product having higher impact and flexural strength characteristics than polymeric ethyl methacrylate which comprises forming a mixture containing monomeric ethyl methacrylate and di-s-butyl itaconate in the ratio of, by weight, 95 parts of the former to 5 parts of the latter and, in addition to said monomers, a small amount of a polymerization catalyst, and heating the said mixture to obtain a solid interpolymerization product.

GAETANO F. D'ALELIO.